United States Patent
Hayes

(10) Patent No.: US 6,781,638 B1
(45) Date of Patent: Aug. 24, 2004

(54) UNIVERSAL REMOTE CONTROL CAPABLE OF SIMULATING A SKIP SEARCH

(75) Inventor: Patrick H. Hayes, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 177 days.

(21) Appl. No.: 09/928,171

(22) Filed: Aug. 10, 2001

(51) Int. Cl.[7] .................................................. H04N 5/44
(52) U.S. Cl. ............................ 348/734; 386/68; 386/69
(58) Field of Search ........................... 348/734; 386/68, 386/81, 82, 83, 46; H04N 5/44

(56) References Cited

U.S. PATENT DOCUMENTS

| | | | |
|---|---|---|---|
| 4,959,810 A | | 9/1990 | Darbee et al. |
| RE33,765 E | | 12/1991 | Takahashi et al. |
| 5,210,661 A | | 5/1993 | Woo |
| 5,228,077 A | | 7/1993 | Darbee |
| 5,255,313 A | | 10/1993 | Darbee |
| 5,414,761 A | | 5/1995 | Darbee |
| 5,426,534 A | * | 6/1995 | Nakata et al. ................. 360/15 |
| 5,481,256 A | | 1/1996 | Darbee et al. |
| 5,515,052 A | | 5/1996 | Darbee |
| 5,526,125 A | * | 6/1996 | Mori et al. ................... 358/311 |
| 5,537,463 A | | 7/1996 | Escobosa et al. |
| 5,552,917 A | | 9/1996 | Darbee et al. |
| 5,614,906 A | | 3/1997 | Hayes et al. |
| 5,689,353 A | | 11/1997 | Darbee et al. |
| 5,861,906 A | | 1/1999 | Dunn et al. |
| 5,953,144 A | | 9/1999 | Darbee et al. |
| 5,959,751 A | | 9/1999 | Darbee et al. |
| 5,999,688 A | | 12/1999 | Iggulden et al. |
| 6,014,092 A | | 1/2000 | Darbee et al. |
| 6,075,919 A | | 6/2000 | Omoto et al. |
| 6,204,886 B1 | * | 3/2001 | Yoshimura et al. .......... 348/564 |
| 6,212,328 B1 | * | 4/2001 | Nakamura .................... 386/83 |
| 6,289,165 B1 | | 9/2001 | Abecassis |
| 6,696,972 B1 | * | 2/2004 | Bryans ................... 340/825.72 |
| 6,690,290 B2 | * | 4/2004 | Young et al. ........... 340/825.69 |

FOREIGN PATENT DOCUMENTS

WO     WO 00/08851     2/2000

OTHER PUBLICATIONS

Home Theater Master, Universal Remote Control, SL–8000 Operating Manual, Rev. 1, pp. 1–50.

* cited by examiner

*Primary Examiner*—Michael H. Lee
*Assistant Examiner*—Trang U. Tran
(74) *Attorney, Agent, or Firm*—Gary R. Jarosik

(57) ABSTRACT

A system and method for using a remote control device to simulate a skip search operation on a consumer appliance playing a recorded media. In response to a sensed activation of a skip search button, the remote control transmits at least one recorded media shuttle command to the consumer appliance and, after waiting a period of time, transmits an additional command to the consumer appliance to cause the recorded media to resume playback at a standard speed. When the media shuttle command is a fast forward command, the simulated skip search is effective for forwarding past timed portions of the recorded media. When the media shuttle command is a rewind command, the simulated skip search is effective for replaying timed portions of the recorded media.

27 Claims, 5 Drawing Sheets

UNIVERSAL REMOTE CONTROL CAPABLE OF SIMULATING A SKIP SEARCH

BACKGROUND OF THE INVENTION

The present invention relates generally to universal remote control devices and, more particularly, to a universal remote control device that includes programming to simulate a skip search in one or both of the forward and reverse directions.

Universal remote control devices are known in the art and include a library of command codes for use in commanding the operation of consumer appliances of different makes, models, and types. Examples of such universal remote control devices can be found in commonly assigned U.S. Pat. Nos. 4,959,810, 5,225,313, 5,228,077, 5,414,761, 5,515,052, 5,537,463, 5,552,917, 5,614,906, 5,689,353, 5,959,751 and 5,953,144, all of which are incorporated herein by reference in their entirety. In select consumer appliances, such as certain video cassette recorders ("VCRs") and certain digital program video recorders ("PVRs"), one operation that can be controlled by a remote control is referred to as a "skip search." As described in published PCT patent application WO 00/0885, a consumer appliance responds to a transmitted skip search command by fast forwarding or rewinding a recorded media for a predetermined time duration before resuming the playing of the recorded media. To perform this operation, the consumer appliance must be preprogrammed to: 1) recognize a skip search command transmission; and 2) initiate the fast forwarding or rewinding of the recorded media in response to the receipt of a skip search command transmission.

While consumer appliances having skip searching capabilities are known in the art, a need exists for allowing users to perform skip searches on recorded media which is playable on a consumer appliance that does not itself having the programming necessary for performing a skip search operation. A need also exists for a remote control device capable of commanding the operation of skip searches on consumer appliances of many different types, makes, and models.

SUMMARY OF THE INVENTION

In accordance with these needs, the present invention resides in a system and method for using a universal remote control device to simulate a skip search operation on a consumer appliance playing a recorded media. In response to a sensed activation of a skip search button, the universal remote control transmits at least one recorded media shuttle command to the consumer appliance and, after waiting a period of time, transmits a second command which causes the consumer appliance to resume normal speed playback. When the media shuttle command is a fast forward command, the simulated skip search is effective for forwarding past timed portions of the recorded media such as, for example, thirty second commercials. When the media shuttle command is a rewind command, the simulated skip search is effective for replaying timed portions of the recorded media. In this manner, the system and method allows a skip search operation to be performed on a plurality of consumer appliances of different types and makes without regard to whether or not the consumer appliance itself has the programming necessary for performing a skip search operation.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
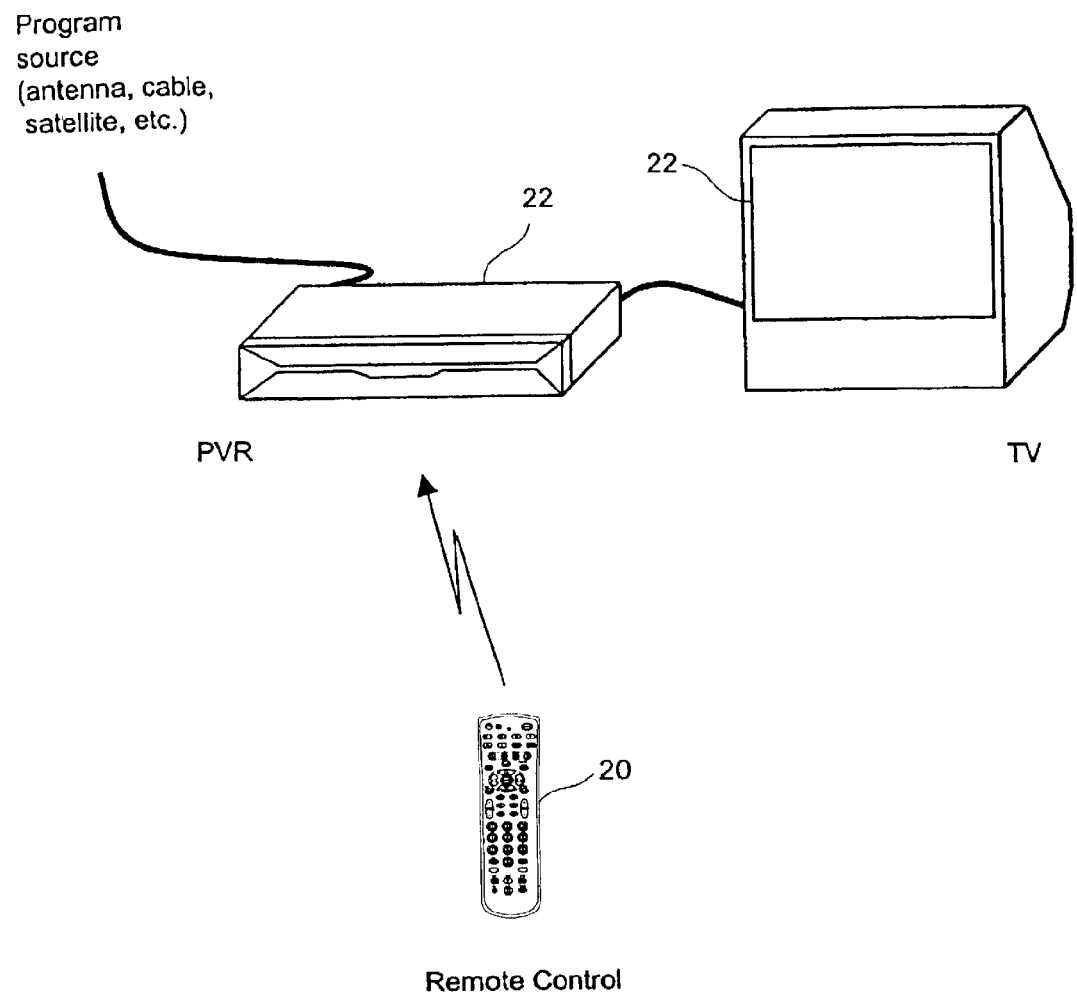
FIG. 1 illustrates a system for simulating a skip search in accordance with the subject invention.
Figure 2:
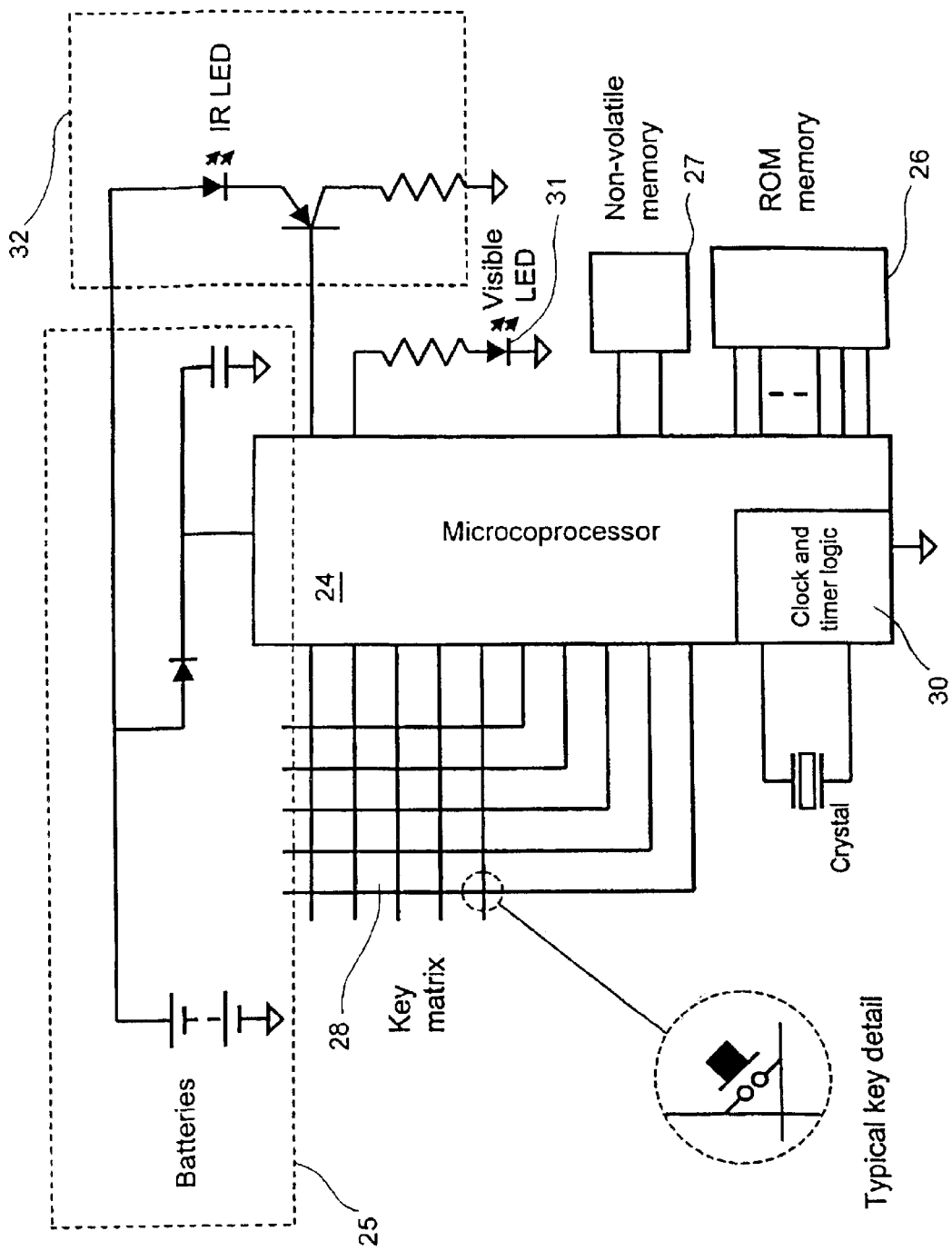
FIG. 2 illustrates a block diagram of an exemplary remote control adapted to simulate a skip search for use in the system illustrated in FIG. 1.

Turning now to the figures, wherein like reference numerals refer to like elements, there is illustrated in FIG. 1 a universal remote control 20 adapted to transmit command codes to remotely controllable consumer appliances 22 such as, by way of example only, televisions, VCRs, PVRs, digital video disc players, cable set top boxes, digital satellite systems, audio amplifiers and tuners, tape/cassette decks, etc. To this end, as illustrated in FIG. 2, the universal remote control 20 preferably includes a microprocessor 24 coupled to a ROM memory 26, a keypad 28 or touch screen having an arrangement of buttons, an internal timer 30, a transmission circuit 32, a non-volatile read/write memory 27, a visible LED 31 to provide visual feedback to the user of the remote control, and a power supply 25.

For controlling the operation of the remote control 20, the ROM memory 26 includes executable instructions that are intended to be executed by the microprocessor 24. In this manner, the microprocessor 24 may be programmed to control the various electronic components within the remote control 20, e.g., to monitor power, to cause the transmission of signals, etc. While the memory 26 is illustrated and described as a ROM memory, it will be appreciated that it may be comprised of any type of computer-readable media, such as ROM, RAM, SRAM, FLASH, EEPROM, or the like. It is preferred that the memory 26 be non-volatile or battery-backed such that data is not required to be reloaded after battery changes. In addition to the ROM memory, a non-volatile read/write memory 27, for example an EEPROM or battery-backed up RAM, may also be provided to store user entered setup data and parameters. Furthermore, the memories 26 and 27 may take the form of a chip, a hard disk, a magnetic disk, and/or an optical disk.

For communicating command codes to different makes, models, and types of consumer appliances, the memory 26 also includes a command code library. The command code library is comprised of a plurality of command codes that may be transmitted from the remote control 20 in response to an event for the purpose of controlling the operation of a consumer appliance. An example of an event would be activation of a button on the remote control 20. In connection with the stored command codes, the memory 26 also includes instructions which the microprocessor 24 uses in connection with the transmission circuit 32 to cause the command codes to be transmitted in a format recognized by identifiable consumer appliances. While the transmission circuit 32 preferably utilizes infrared transmissions, it will be appreciated that other forms of wired or wireless, such as radio frequency, transmissions may also be used.

To identify consumer appliances by type and make (and sometimes model) such that the universal remote control 20 is adapted to transmit command codes in the formats appropriate for such identified consumer appliances, data may be entered into the universal remote control 20. Since methods for setting up a remote control to control the operation of specific consumer appliances is well-known, it will not be described in greater detail herein. Nevertheless, for additional information pertaining to remote control setup, the reader may turn to U.S. Pat. Nos. 5,614,906 and 4,959,810 which are incorporated herein by reference in their entirety.

To cause the universal remote control 20 to perform an action, a user may interact with one or more keys on the keypad 28. Optionally, the user may also interact with a display provided that the display is a touch screen display or the like. In response to events generated by interacting with the aforementioned components of the universal remote control 20 the universal remote control 20 can transmit command codes to consumer appliances or perform local operations. While not limiting, local operations that may be performed by the remote control 20 include favorite channel setup, macro button setup, etc. Since examples of local operations can be found in U.S. Pat. Nos. 5,481,256, 5,959, 751, 6,014,092, which are incorporated herein by reference in their entirety, they will not be discussed in greater detail herein.

Figure 3:
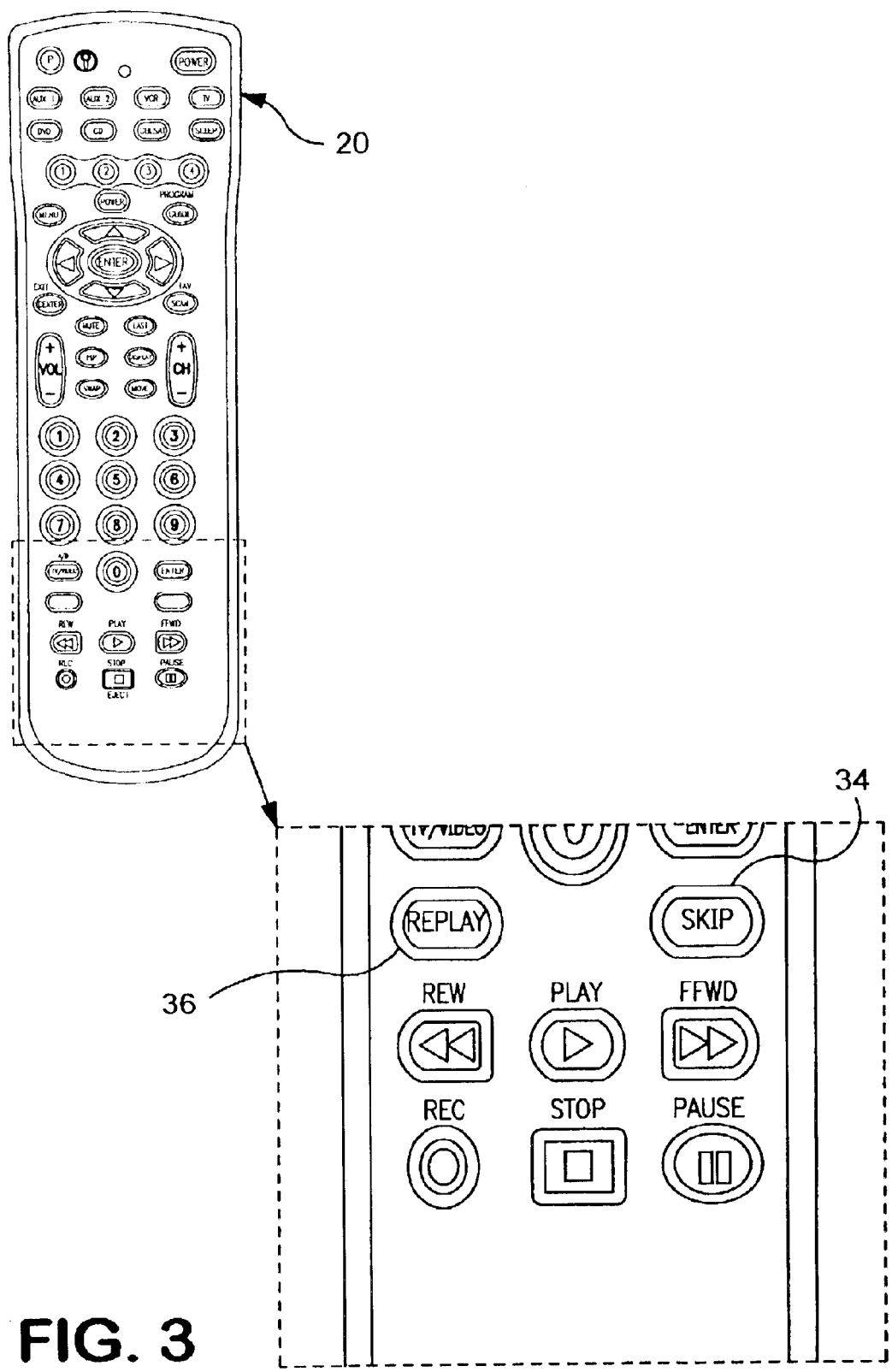
FIG. 3 illustrates an exemplary keypad of the remote control of FIGS. 1 and 2.

For causing the universal remote control 20 to issue command codes that function to simulate a skip search on a consumer appliance 22, the universal remote control may support a "skip" key 34 and/or a "replay" key 36. While illustrated in FIG. 3 as being physical keys on the universal remote control 20, it will be appreciated that the "skip" key 34 and/or the "replay" key 36 can be represented as virtual keys on a touch screen display or the like. In response to activation of the "skip" key 34, the universal remote control 20 simulates a forward skip search by sending a series of command codes that cause the consumer appliance 22 to fast forward a recorded media for a predetermined time duration before resuming the playing of the recorded media. In response to activation of the "replay" key 36, the universal remote control 20 simulates a reverse skip search by sending a series of command codes that causes the consumer appliance to rewind a recorded media for a predetermined time duration before resuming the playing of the recorded media.

Figure 4:
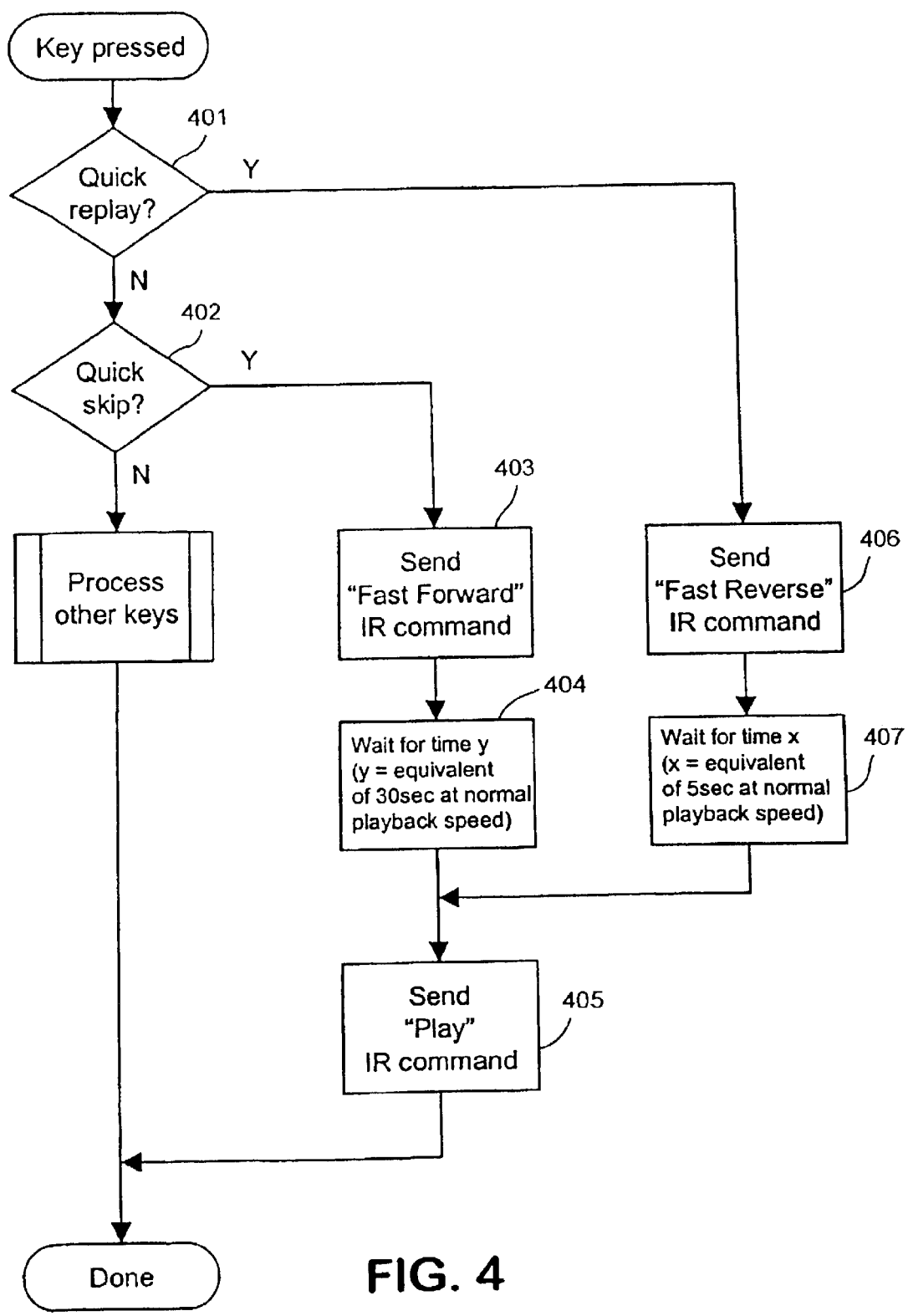
FIG. 4 illustrates a flow chart diagram of an exemplary method for simulating a skip search for use in the remote control illustrated in FIGS. 1 and 2.

To simulate a forward skip search during the playing of a recorded media, illustrated in FIG. 4, the universal remote control 20 responds to activation (402) of the "skip" key 34 by transmitting to the consumer appliance 22 one or more fast forward recorded media shuttle command codes (403) followed, after an internally timed forward wait time (404), by a play command code (405). It will be appreciated that although the "play" command is used herein by way of example, on some devices other commands e.g., a media shuttle command "fast" in the opposite direction, may also serve to perform this function. One or more fast forward command codes can be issued to a consumer appliance 22 since certain consumer appliances are responsive to multiple fast forward commands to play the recorded media at increasingly faster playback rates. By way of example, as illustrated in Table 1 below, the TiVO brand PVR responds to the first receipt of a fast forward command (while currently playing the recorded media) by playing the recorded media at six times the standard (i.e., real time) playback speed. In response to the next receipt of a fast forward command, the TiVO brand PVR causes the recorded media to be played at twelve times the standard playback speed. Up to three fast forward commands can be transmitted to the TiVO brand PVR in response to which the recorded media will be played back at sixty times the standard playback speed.

TABLE 1

| TRANSMITTED FAST FORWARD COMMANDS | FAST FORWARD PLAYBACK SPEED RELATIVE TO STANDARD PLAYBACK SPEED | REMOTE CONTROL WAIT TIME FOR 30 SECOND FORWARD SKIP |
| --- | --- | --- |
| first | 6× | 5 sec |
| second | 12× | 2.5 sec |
| third | 60× | 0.5 sec |

The forward wait time maintained internally within the universal remote control is preferably selected so as to allow the consumer appliance 22 to achieve approximately the same recorded media playback position after fast forwarding that the consumer appliance 22 would have achieved if the recorded media were being played at the standard playback speed for a predetermined period of time. While not limiting, this predetermined period of time is preferably selected to be approximately thirty seconds since thirty seconds typically corresponds to the play length of a commercial at standard playback speed. Thus, if the fast forward playback speed (ffps) relative to the standard playback speed (sps) can be determine, the internally timed forward wait time (fwt) can be determined as:

$$fwt = \text{predetermined time period} * (sps/ffps) \qquad (1)$$

By way of example, if the fast forward playback speed is approximately 6× the standard playback speed (as is the case when the TiVO brand PVR receives one fast forward command), the internally timed forward wait time should be approximately 5 seconds as shown in Table 1, above. As will be apparent from Table 1, the internally timed forward wait time may be dependent upon the number of fast forward commands the universal remote control 20 is configured to transmit in response to the activation of the "skip" key 34.

As noted previously, after the internally timed forward wait time has elapsed, the universal remote control 20 transmits a play or other command (405) to the consumer appliance 22 which causes the consumer appliance 22 to resume the playing of the recorded media at the standard playback speed. The internally timed forward wait time can be adjusted to a slightly shorter period to compensate for the time it takes a viewer to activate the "skip" key 34 in reaction to the perceived start of a commercial. Likewise, when used with systems which offer "overshoot correction," i.e., the consumer appliance automatically rewinds a predetermined amount of time to compensate for reaction time when a play command follows a fast forward command, the internally timed forward wait time can be adjusted to a slightly longer period if the overshoot correction cannot be disabled.

To allow for maximum flexibility, the user may be provided with the ability to setup the universal remote control 20 to specify the internally timed forward wait time. To this end, the user might activate a setup key or switch followed by activation of the "skip" key 34. The user could then use the number keys on the universal remote control 20 to specify the internally timed forward wait time, preferably in milliseconds. Alternatively, the user could enter the fast forward speed of his device (ffps) obtained from, for example the user manual, and software programming in the remote control could calculate the requisite wait time in accordance with equation (1) above. In either event, the entered or derived internally timed forward wait time would be maintained in memory (preferably in the non-volatile memory 27) and would be used as the internally timed forward wait time when the "skip" key 34 is subsequently activated. It will be appreciated that the same general procedure could also be used to allow a user to set the number of fast forward commands the universal remote control 20 will transmit in response to activation of the "skip" key 34.

Within the memory 26 of the universal remote control 20 the number of fast forward commands to be transmitted and the internally timed forward wait time can also be maintained for different types and makes (and sometimes models) of consumer appliances 22. In this manner, when the user sets up the device for a specific type and make (and sometimes model) of consumer appliance, the number of fast forward commands to transmit and the appropriate forward wait time for the identified consumer appliance will automatically be accessed when the "skip" key 34 is activated. This allows the "skip" key 34 to simulate a forward skip search for a plurality of different types and makes of consumer appliances transparently to the user. By way of example, the default parameters for the TiVO brand PVR described earlier might be as illustrated in Table 2 below:

TABLE 2

| MEDIA SHUTTLE COMMAND | NUMBER OF REPETITIONS TO SEND | DELAY TIME | RESUME PLAYBACK COMMAND | OVERSHOOT CORRECTION |
|---|---|---|---|---|
| Fast forward | 2 | 2.5 seconds | Play | Yes |

To simulate a reverse skip search during the playing of a recorded media, also illustrated in FIG. 4, the universal remote control 20 responds to activation (402) of the "replay" key 36 by transmitting to the consumer appliance one or more rewind recorded media shuttle command codes (406) followed, after an internally timed reverse wait time (407), by a play or other command code (405). One or more rewind command codes can be issued to a consumer appliance 22 since certain consumer appliances are responsive to multiple rewind commands to play the recorded media at increasingly faster playback rates in the reverse direction. By way of example, as illustrated in Table 3 below, the TiVO brand PVR responds to the first receipt of a rewind command (while currently playing the recorded media) by playing the recorded media in the reverse direction at six times the standard (i.e., real time) playback speed. In response to the next receipt of a rewind command, the TiVO brand PVR causes the recorded media to be played in the reverse direction at twelve times the standard playback speed. Up to three rewind commands can be transmitted to the TiVO brand PVR in response to which the recorded media will be played in the reverse direction at sixty times the standard playback speed.

TABLE 3

| TRANSMITTED FAST REVERSE COMMANDS | REVERSE PLAYBACK SPEED RELATIVE TO STANDARD PLAYBACK SPEED | REMOTE CONTROL WAIT TIME FOR 6 SECOND REVERSE SKIP |
|---|---|---|
| first | 6× | 1 sec |
| second | 12× | 0.5 sec |
| third | 60× | 0.1 sec |

In this case, the internally timed reverse wait time is preferably selected so as to allow the consumer appliance 22 to approximately achieve a recorded media playback position after rewinding that the consumer appliance 22 would have had to start with to achieve the playback position exited from if the recorded media were being played at the standard playback speed for a predetermined period of time. While not limiting, this predetermined period of time is preferably selected to be approximately six seconds since six seconds typically corresponds to the play length of an event of interest in a sports program at standard playback speed. Thus, if the rewind playback speed (rps) relative to the standard playback speed (sps) can be determine, the internally timed reverse wait time (rwt) can be determined as:

$$rwt = \text{predetermined time period} * (sps/rps) \quad (2)$$

By way of example, if the rewind playback speed is approximately 6× the standard playback speed (as is the case when the TiVO brand PVR receives one rewind command), the internally timed reverse wait time should be approximately 1 second as shown in Table 3, above. As will be apparent from Table 3, the internally timed reverse wait time may be dependent upon the number of rewind commands the universal remote control 20 is configured to transmit in response to the activation of the "replay" key 36. It is to be further noted that the shorter internally timed reverse wait times (which correspond to higher rewind playback speeds) will probably only work on a PVR, DVD, or similar digital device. On a VCR, cassette deck, or the like, the mechanical inertia of stopping and reversing the tape probably precludes anything but using the slowest rewind playback speed.

As was the case noted previously with respect to the "skip" key 34, the universal remote control 20 can be adapted to allow the user to configure the number of rewind commands to transmit and/or the internally timed reverse wait time that are to be associated with activation of the "replay" key 36. Similarly, the number of rewind commands to transmit and the internally timed reverse wait time for use in simulating a reverse skip search in connection with consumer appliances of different types and makes (and sometimes models) can also be stored in memory within the universal remote control 20.

Figure 5:
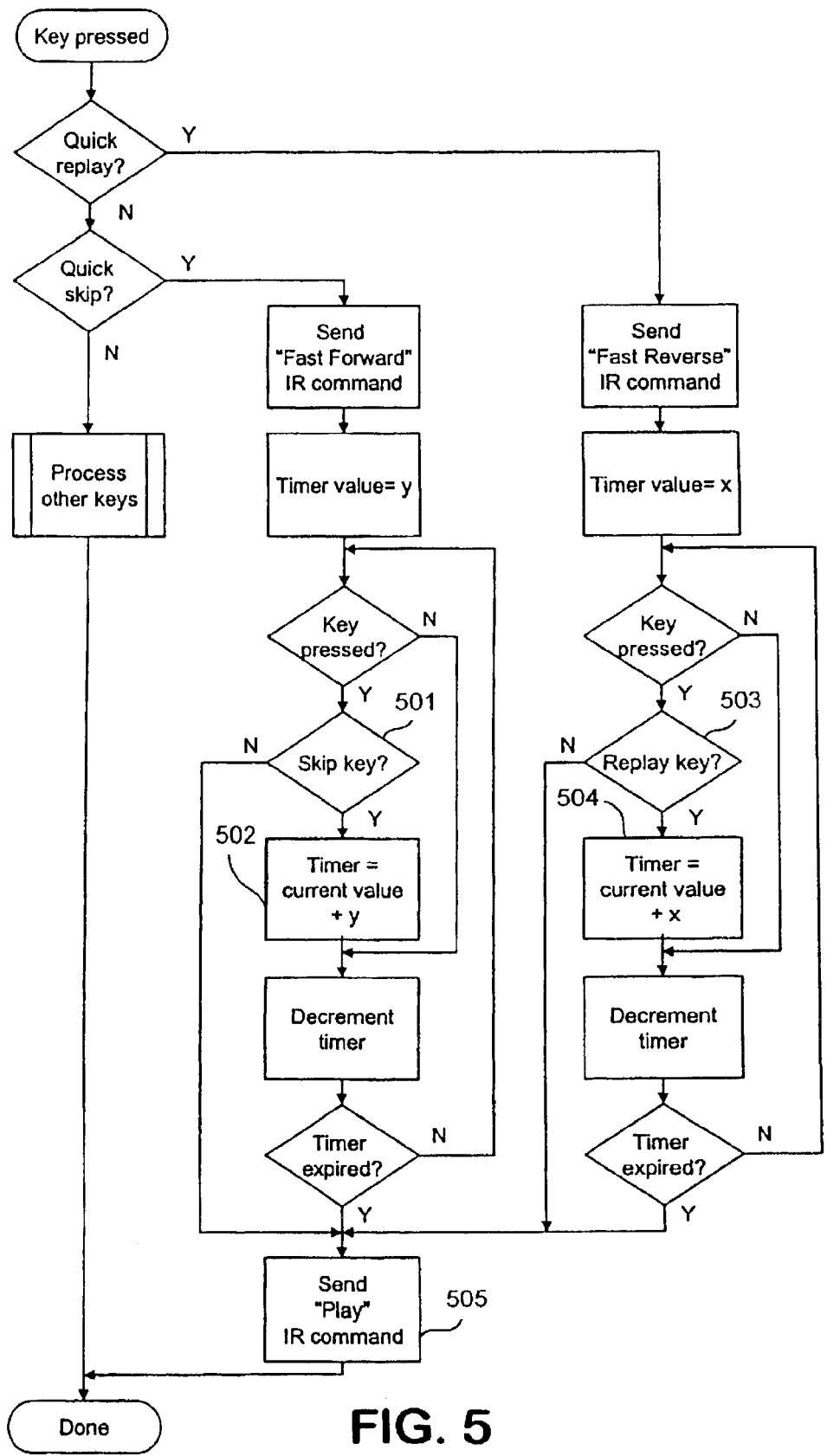
FIG. 5 illustrates a flow chart diagram of an exemplary method for simulating multiple skip searches for use in the remote control illustrated in FIGS. 1 and 2.

To allow additional increments of time to be skipped in either the forward or reverse directions, the universal remote control 20 is adapted to respond to activation of either the "skip" key 34 or the "replay" key 36 multiple times as illustrated in FIG. 5. For example, if the "skip" key 34 is activated an additional time (501) while a forward skip search simulation is already in progress, the internal timer that counts down the wait time is incremented (502) by an amount equal to the internally timed forward wait time. For example, if an internally timed forward wait time of 2.5 seconds is being used before the play command is transmitted, a subsequent activation of the "skip" key 35 during the forward skip search simulation will add an additional 2.5 seconds of wait time before the play command is transmitted (505). In this manner, approximately 60 seconds of recorded media (played at standard playback speed) will be skip searched, in keeping with the previously described examples. Similarly, if the "replay" key 36 is activated an additional time (503) while a reverse skip search simulation is in progress, the internal timer that counts down the wait time is incremented (504) by an amount equal to the internally timed reverse wait time to allow the recorded media to be reverse skip searched a greater temporal distance before the play command is transmitted. If the user wishes to manually end a skip search, activation of another button on the remote control can be used to signal this desire and cause the issuance of a play command as is illustrated in FIG. 5.

For determining which command codes and formatting to use when sending the command codes for simulating a skip search, the universal remote control 20 can be adapted to use the command codes and formatting that were identified as being appropriate for the currently selected device operating mode of the universal remote control 20 (e.g., VCR, PVR, DVD, etc.). In this case, if the currently selected device operating mode did not support skip searching (e.g., TV which does not play a recorded media), activation of the "skip" key 34 or "replay" key 36 would perform no action. Alternatively, if the currently selected device operating mode does not support skip searching the universal remote control 20 can transmit the command codes for simulating a skip search using the command codes and formatting that were identified as being appropriate for the last selected device operating mode that is capable of supporting skip searching. Still further, the user may be given the ability to lock the "skip" key 34 and "replay" key 36 to a specific device operating mode.

In certain circumstance a consumer appliance advances or rewinds the recorded media only for so long as the appropriate shuttle command is being transmitted (i.e., in normal operation, the user is required to maintain activation of the fast forward or rewind button to advance or rewind the recorded media). In these circumstances, the remote control 20 is adapted to repeatedly transmit the shuttle command for the duration of the forward or reverse wait time when simulating a skip search. Once the wait time has expired, the remote control 20 ceases the transmission of the shuttle command which causes the consumer appliance to resume playback of the recorded media at a standard speed.

While specific embodiments of the present invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. In a remote control having a skip search button and a timer, a method for simulating a skip search operation on a consumer appliance playing a recorded media, comprising:

sensing activation of the skip search button of the remote control; and in response to a sensed activation of the skip search button, transmitting from the remote control at least one recorded media shuttle command to the consumer appliance; activating the timer of the remote control to measure a period of time; and, after the period of time has lapsed, transmitting from the remote control an additional command to the consumer appliance to cause the recorded media to resume playback at a standard speed.

2. The method as recited in claim 1, wherein the additional command is a play command.

3. The method as recited in claim 1, wherein the recorded media shuttle command comprises a fast forward command.

4. The method as recited in claim 1, wherein the recorded media shuttle command comprises a rewind command.

5. The method as recited in claim 1, wherein the period of time is determined as a function of the speed at which the recorded media is played within the consumer appliance under the influence of the shuttle command, the speed at which the recorded media is played within the consumer appliance under the influence of the play command, and a time of recorded media playback to be skipped over.

6. The method as recited in claim 1, wherein the period of time includes a compensation for time it takes a user to activate the skip search button.

7. The method as recited in claim 1, wherein the period of time includes a compensation for a consumer appliance overshoot correction feature.

8. The method as recited in claim 1, wherein the recorded media shuttle command comprises a plurality of fast forward commands.

9. The method as recited in claim 1, wherein the recorded media shuttle command comprises a plurality of rewind commands.

10. The method as recited in claim 1, further comprising the step of receiving into the remote control user input that establishes the period of time.

11. The method as recited in claim 10, wherein the user input comprises a user entered wait time.

12. The method as recited in claim 10, wherein the user input comprises data functioning to identify the consumer appliance.

13. The method as recited in claim 1, further comprising the step of accepting into the remote control user input to increase the period of time before the step of transmitting the additional command.

14. The method as recited in claim 13, wherein the user input comprises a further activation of the skip search button.

15. The method as recited in claim 1, further comprising the step of accepting into the remote control user input to end the period of time before performing the step of transmitting the additional command.

16. The method as recited in claim 15, wherein the user input comprises activation of a button other than the activated skip search button.

17. The method as recited in claim 1, wherein the consumer appliance comprises a PVR.

18. The method as recited in claim 1, wherein the recorded media shuttle command is repeatedly transmitted to the consumer appliance for the duration of the period of time and the additional command comprises the cessation of the transmission of the recorded media shuttle command.

19. For use in a remote control having a skip search button and a timer, a readable media having instructions for use in simulating a skip search operation on a consumer appliance playing a recorded media, the instructions performing steps comprising:

sensing activation of the skip search button of the remote control; and in response to a sensed activation of the skip search button, transmitting from the remote control at least one recorded media shuttle command to the consumer appliance; activating the timer of the remote control to measure a period of time; and, after the period of time has lapsed, transmitting from the remote control an additional command to the consumer appliance to cause the recorded media to resume playback at a standard speed.

20. The readable media as recited in claim 19, wherein the additional command is a play command.

21. The readable media as recited in claim 19, wherein the recorded media shuttle command comprises a fast forward command.

22. The readable media as recited in claim 19, wherein the recorded media shuttle command comprises a rewind command.

23. The readable media as recited in claim 19, wherein the instructions perform the further step of receiving into the remote control user input that establishes the period of time.

24. The readable media as recited in claim 19, wherein the consumer appliance comprises a PVR.

25. The readable media as recited in claim 19, wherein the consumer appliance comprises a VCR.

26. The readable media as recited in claim 19, wherein the instructions perform the step of sensing a second activation of the skip search button and, in response, increasing the period of time.

27. A universal remote control, comprising:
   a memory having a library of commands for use in commanding the operation of consumer appliances of different makes and models;
   a keypad having a plurality of buttons including a skip search button; and
   a transmission circuit for transmitting to an identified consumer appliance one or more commands selected from the library in response to activation of one or more buttons on the keypad;
   where in the memory further has instructions for use in simulating a skip search operation on the identified consumer appliance, the instructions performing steps comprising:
      sensing activation of the skip search button of the universal remote control; and
      in response to a sensed activation of the skip search button, transmitting from the universal remote control to the identified consumer appliance via the transmission circuit at least one recorded media shuttle command selected from the library; activating a timer of the universal remote control to measure a period of time; and, after the period of time has lapsed, transmitting an additional command from the universal remote control to the consumer appliance to cause the recorded media to resume playback at a standard speed.

* * * * *